June 14, 1949.  R. H. WHISLER, JR  2,473,043
SHOCK ABSORBER STRUCTURE
Filed Aug. 28, 1944  2 Sheets-Sheet 1
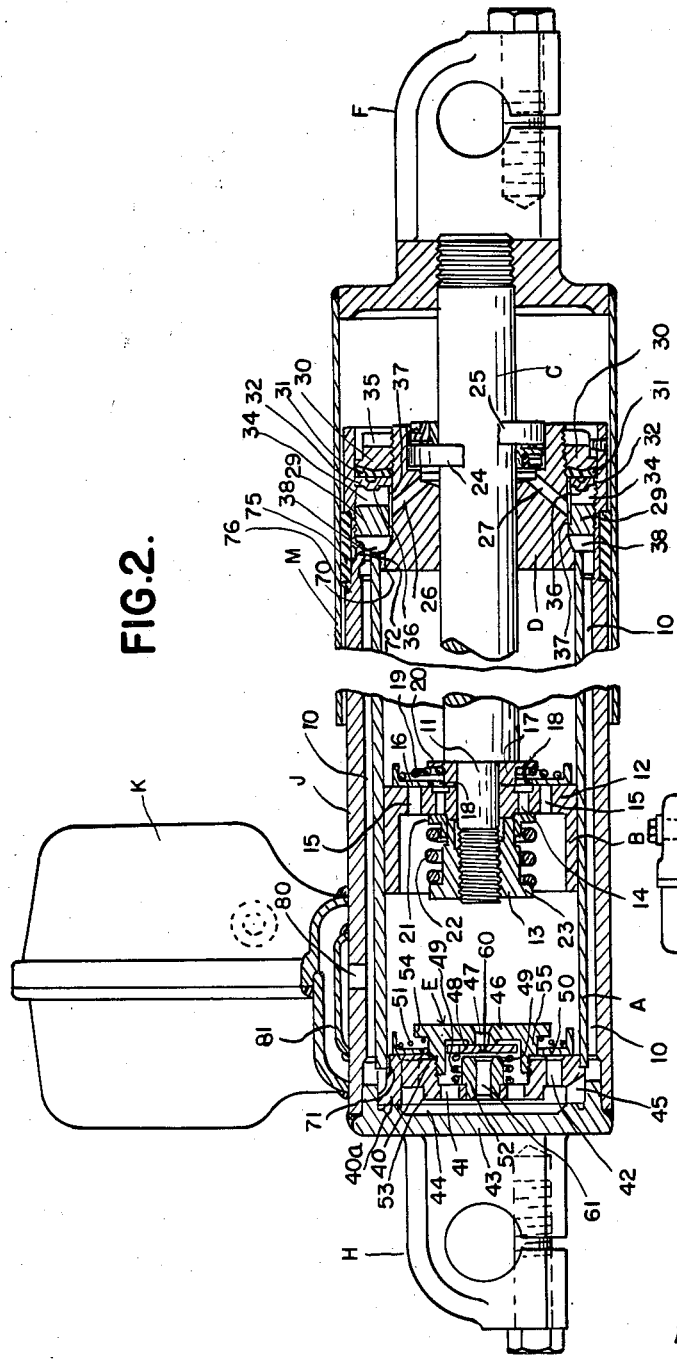
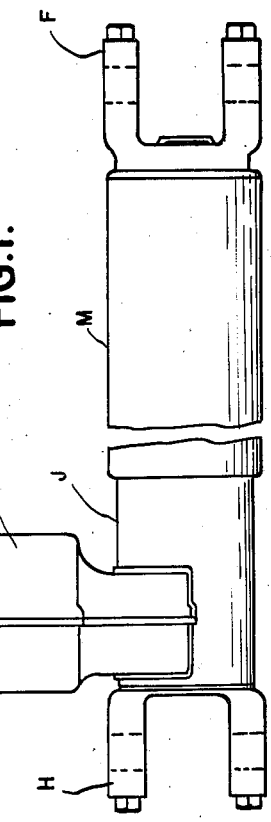
INVENTOR.
RALPH H. WHISLER Jr.
BY
Whittemore Hulbert & Belknap
ATTORNEYS June 14, 1949.  R. H. WHISLER, JR  2,473,043
SHOCK ABSORBER STRUCTURE
Filed Aug. 28, 1944  2 Sheets-Sheet 2

INVENTOR.
RALPH H. WHISLER Jr.
BY
Whittemore Hulbert &Belknap
ATTORNEYS

Patented June 14, 1949

2,473,043

UNITED STATES PATENT OFFICE 2,473,043

SHOCK ABSORBER STRUCTURE

Ralph H. Whisler, Jr., Monroe, Mich., assignor to Monroe Auto Equipment Company, Monroe, Mich., a corporation of Michigan Application August 28, 1944, Serial No. 551,531

9 Claims. (Cl. 277—45)

This invention relates generally to shock absorbers and refers more particularly to hydraulic shock absorbers of the direct acting type.

One of the essential objects of the invention is to provide a shock absorber of the type mentioned capable of being installed in a substantially horizontal position upon vehicles to stabilize the action of relatively movable parts thereof. More specifically, it is an object to provide a shock absorber having an improved valve assembly for controlling the flow of hydraulic medium between the pressure cylinder and the reserve chamber thereof.

Another object is to provide a shock absorber valve assembly having a body and an adjusting nut forming a housing for a compression valve and spring therefor.

Another object is to provide a valve assembly wherein a member within the housing, and preferably carried by the body, serves as a stop for the compression valve and as a guide for a spring for said compression valve.

Another object is to provide a valve assembly wherein the nut forms a combination guide and retainer for a rebound valve and spring therefor.

Another object is to provide a compact assembly that is simple in construction, economical to manufacture, easy to install and efficient in operation.

Other objects, advantages and novel details of construction of this invention will be made more apparent as this description proceeds, especially when considered in connection with the accompanying drawings, wherein:

Fig. 1 is a fragmentary elevational view of a hydraulic shock absorber structure embodying my invention;

Fig. 2 is an enlarged fragmentary vertical longitudinal sectional view through the structure illustrated in Fig. 1;

Figure 3:
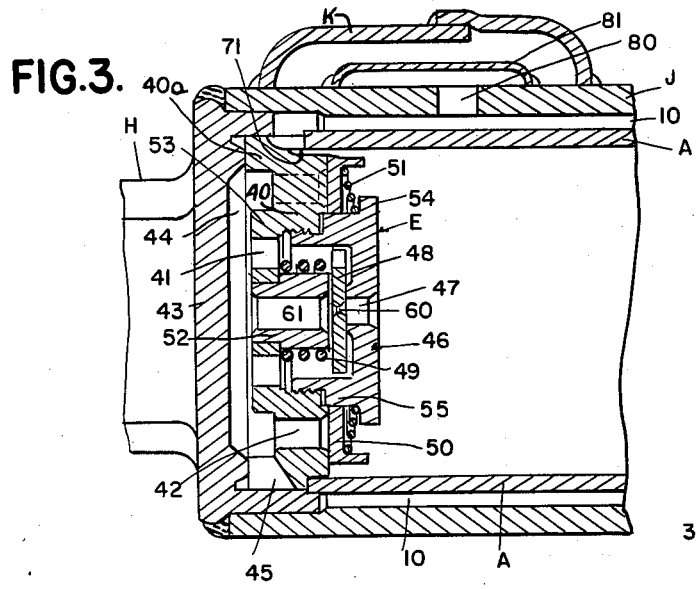
Fig. 3 is an enlarged fragmentary longitudinal sectional view through the valve assembly and associated parts of the shock absorber.
Figure 9:
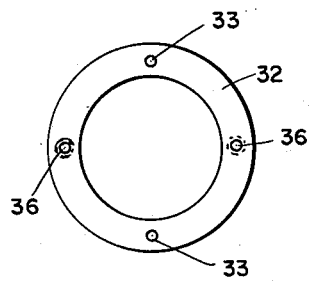
Fig. 9 is a plan view of the washer 32.
Figure 4:
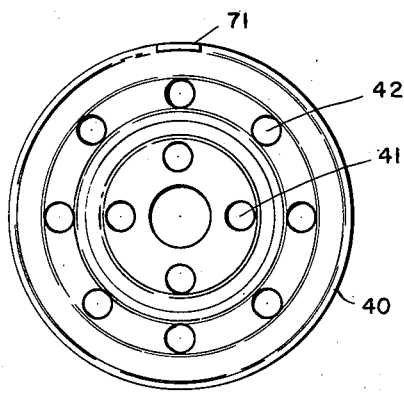
Fig. 4 is an inner end view of the body 40 of the valve assembly.
Figure 6:
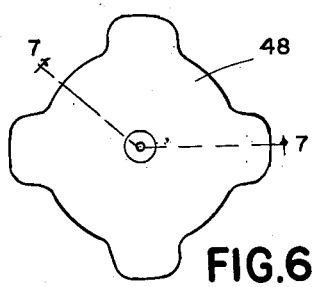
Fig. 6 is a plan view of the valve 48.
Figure 5:
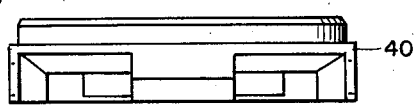
Fig. 5 is a side elevation of the body illustrated in Fig. 4.
Figure 7:
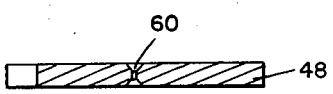
Fig. 7 is a sectional view taken substantially on the line 7—7 of Fig. 6.
Figure 8:
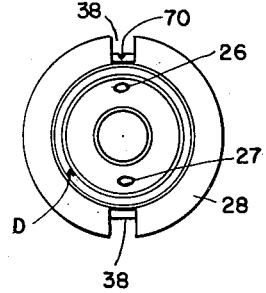
Fig. 8 is an end view of the closure D, with the seal assemblies 24 and 25 respectively removed.

Referring now to the drawing, A is a pressure cylinder, B is a reciprocating piston in said cylinder, C is an actuating rod for the piston, D is a combination closure for one end of the cylinder and a guide for the rod, E is a valve assembly at the other end of the cylinder, F and H respectively are apertured attaching heads for the rod C and cylinder A adapted to be connected to relatively movable parts (not shown) of a vehicle, J is a tubular casing substantially concentric with the pressure cylinder A and cooperating therewith and with the head H and closure D to form a reserve chamber 10, K is an auxiliary chamber on top of and rigid with the casing J, and M is a dirt shield carried by the head F and substantially concentric with the casing J.

As shown, the piston B is mounted on a reduced inner end portion 11 of the rod C and slidably engages the inner walls of the pressure cylinder A. The head 12 of the piston is held on the rod C by a sleeve type nut 13 threadedly engaging the reduced portion 11 of the rod and has inner and outer passages 14 and 15 respectively therethrough for hydraulic medium in the cylinder A. A peripherally flanged disc valve 16 slidably mounted on a collar 17 on the reduced portion 11 of the rod controls the flow of hydraulic medium through the outer series of passages 15 on the compression stroke of the piston and has suitable openings 18 registering with the inner series 14 of passages. A coil spring 19 surrounding the collar 17 between the valve 16 and a washer 20 on the rod serves to normally hold the valve 16 in closed position against the head 12 of the piston.

A valve 21 slidable on the sleeve type nut 13 controls the flow of hydraulic medium through the inner series of passages 14 on the rebound stroke of the piston and is normally held in closed position by means of a coil spring 22 encircling the sleeve type nut 13 between a lateral flange 23 thereof and the valve 21.

The closure member D is within and constitutes an endwise extension of the cylinder A. Preferably the closure member D contains two seal assemblies 24 and 25 respectively engaging the piston rod C, and has inclined passages 26 and 27 for conducting to the reserve chamber 10 any hydraulic medium that may be scraped or wiped from the rod C by the seal assemblies 24 and 25.

Located between the closure member D and casing J, upon the outer side of an annular flange 28 of the closure member, are inner and outer locking rings 29 and 30 respectively, a resilient gasket 31, and a retaining washer 32 for the gasket. As shown, the inner locking ring 29 threadedly engages the casing J, while the outer locking ring 30 threadedly engages the closure member D. The gasket 31 is compressed between the outer ring 30 and washer 32.

In order that the washer 32 and the inner and outer locking rings 29 and 30 respectively may be adjusted into and out of assembled relation with the other parts, the washer 32 has suitable holes 33 for the reception of a suitable removing tool (not shown), and the rings 29 and 30 are provided with slots 34 and 35 respectively for receiving portions of a wrench or other suitable removing tool (not shown).

To prevent portions of the gasket 31 from being compressed or forced through the holes 33 in the washer 32 into the slots 34 in the inner locking ring 29 and thereby causing inadequate sealing, the washer 32 has suitable projections 36 that are spaced from the holes 33 and are received in the slots 34 in the inner locking ring when the parts are assembled. Thus the holes 33 in the washer 32 will be out of registration with the slots 34 when the projections 36 are received in said slots.

The inner locking ring 29 is spaced slightly from the closure member D to provide an annular pasage 37 for hydraulic medium from the passages 26 and 27 respectively, and the flange 28 of the closure member is slotted at 38 to permit such hydraulic medium to pass therethrough to the reserve chamber 10.

The valve assembly E has a substantially cup shaped body 40 provided with a lateral flange 40a that is clamped between the cylinder A and attaching head H. The base 53 of the body 40 and the lateral flange 40a have passages 41 and 42 respectively for hydraulic medium. Preferably the body 40 is spaced from the central portion 43 of the head H to provide a recess 44, and is provided with one or more passages 45 extending between said recess 44 and the reserve chamber 10. A substantialy cup shaped locking nut 46 threadedly engages the interior of the cup shaped body 40 and has a central passage 47 for hydraulic medium. A disc valve 48 controls the flow of hydraulic medium through the central passage 47 in the nut 46 during the compression stroke of the piston B and is normally held in closed position by a coil spring 49, while a disc valve 50 controls the flow of hydraulic medium through the outer passages 42 during the rebound stroke of the piston and is normally held in closed position by a coil spring 51. Preferably an abutment member or stop 52 for the valve 48 is pressed within the base 53 of the body 40 and serves to limit the opening movement of said valve. Such member 52 is within and serves as a guide for the coil spring 49. In fact this member 52, the spring 49 and the valve 48 are enclosed within a sectional housing formed by the body 40 and nut 46. The nut 46 is adjustable relative to the body 40 to vary the tension of both springs 49 and 51.

A lateral flange 54 of the nut 46 cooperates with the body 40 to limit movement of the spring 51 and valve 50. The annular part 55 of the nut 46 serves as a guide for both the valve 50 and spring 51 during movement thereof.

If desired, the compression valve 48 may have a restricted central orifice 60 for hydraulic medium substantially in alignment with the passage 47 in the nut 46 and with a central passage 61 in the stop member 52 for said valve so that a restricted amount of hydraulic medium may flow through the orifice 60 from the cylinder A to the reserve chamber 10 and vice versa during reciprocating movement of the piston B in the cylinder.

The attaching head H is rigid with the casing J, while the head F is rigid with the piston rod C. The tubular dirt shield M is rigid with the head F and cooperates therewith to form an enclosure for the closure member D and associated parts.

In the present instance a pair of longitudinally aligned air bleed notches or grooves 70 and 71 respectively are provided in the closure member D and body 40 of the valve assembly, preferably at the top of the shock absorber, to permit air to escape from the interior of the cylinder A to the reserve chamber 10 during the compression and rebound strokes of the piston.

In order that the air bleed notch 70 in the closure member D will be in proper alignment with the notch 71 in the body 40 of the valve assembly when the parts are assembled, the casing J is provided at the top thereof with a projection or indentation 72 that is engageable with a slot 38 in the flange 28 of the closure member D. Thus, when the parts are assembled, the notches 70 and 71 will not only be in alignment but will be at the top of the casing J. Moreover, relative turning movement between the parts is prevented.

A mud wiper 75 of any suitable material such as wadding of fabric covers the indentation 72 and is anchored in a suitable recess 76 in the top of the casing J for wiping engagement with the dust shield M.

The auxiliary chamber K is in the form of a laterally projecting substantially L-shaped dome upon the top of the casing J and is preferably welded or otherwise rigidly secured thereto. An opening 80 in the casing J establishes communication between the interior of the reserve chamber 10 and the interior of the auxiliary chamber K, and a shield or deflector 81 is fixed to the casing J over the opening 80 and projects laterally within the auxiliary chamber K. Normally the level of hydraulic medium in the auxiliary chamber K is approximately at the line 82. Thus the hydraulic medium will fill the reserve chamber 10 and partially fill the auxiliary chamber K, while air may collect in the top of auxiliary chamber K above the level of hydraulic medium therein. As a result, the reserve chamber 10 and auxiliary chamber K collectively will have sufficient capacity to take care of the hydraulic medium in the shock absorber under all conditions of operation.

In use, the piston B will be on its compression stroke in the cylinder A when the attaching heads F and H at opposite ends of the shock absorber are moved toward each other by relatively movable parts of a vehicle (not shown) to which they are connected. On the compression stroke, the hydraulic medium in the cylinder A will flow through the outer passages 15 in the piston to open the valve 16, and will flow through the passage 47 in the nut 46 past the valve 48 and thence through the inner passages 41 in the body 40 of the valve assembly to the reserve chamber 10.

When the attaching heads F and H are moved away from each other by the relatively movable parts of the vehicle, the piston B will be on its rebound stroke and will cause hydraulic medium in the reserve chamber 10 to flow through the outer passages 42 in the body 40 of the valve assembly past the valve 50 to the interior of the cylinder A, and will cause hydraulic medium in the cylinder A to flow through the inner passages 14 in the piston B to open the valve 21. Thus the proper resistance in both directions will be properly afforded.

During the compression stroke, air in the cylinder A may escape through the notch 71 in the body 40 of the valve assembly to the reserve chamber 10 and thence through the opening 80 in the casing J to the interior of the auxiliary chamber K. During the rebound stroke, air in the cylinder A may escape through the notch 70 in the closure member D to the reserve chamber 10 and thence through the opening 80 in the casing J to the auxiliary chamber K.

What I claim as my invention is:

1. A valve assembly of the class described comprising a substantially cup shaped member having a lateral flange, the base of the cup shaped member and said flange having one or more passages therethrough for hydraulic medium, an inverted substantially cup shaped member opening toward and cooperating with the cup shaped member aforesaid to form an enclosure, the second member being adjustably connected to the first mentioned member and having a lateral flange substantially parallel to the flange of the first mentioned member, the base of said second member having a passage therethrough for hydraulic medium, a disc valve within said enclosure controlling the flow of hydraulic medium through the passage in the base of said second member, a stop for said valve extending through the base of the first member and having a passage therethrough for hydraulic medium, a coil spring sleeved on said stop and normally holding said disc valve in closed position, an annular valve sleeved on said second member between the parallel flanges of both members and controlling the flow of hydraulic medium through the passages in the lateral flange of said first member, and a coil spring sleeved on said second member between the flange thereof and said annular valve and normally holding the latter in closed position.

2. A valve assembly of the class described comprising a substantially cup shaped member having a lateral flange, the base of the cup shaped member and said flange having one or more passages therethrough for hydraulic medium, an inverted substantially cup shaped member opening toward and cooperating with the cup shaped member aforesaid to form an enclosure, the second member being adjustably connected to the first mentioned member and having a lateral flange substantially parallel to the flange of the first mentioned member, the base of said second member having a passage therethrough for hydraulic medium, a disc valve within said enclosure controlling the flow of hydraulic medium through the passage in the base of said second member, a stop for said valve extending through the base of the first member and having a passage therethrough for hydraulic medium, a coil spring sleeved on said stop and normally holding said disc valve in closed position, said disc valve having an orifice for hyraulic medium in communication with the passages aforesaid in the stop and in the base of said second member, an annular valve sleeved on said second member between the parallel flanges of both members and controlling the flow of hydraulic medium through the passages in the lateral flange of said first member, and a coil spring sleeved on said second member between the flange thereof and said annular valve and normally holding the latter in closed position.

3. A valve assembly of the class described comprising a substantially cup shaped member having a lateral flange, the base of the cup shaped member and said flange having one or more passages therethrough for fluid, an inverted substantially cup shaped member opening toward and cooperating with the cup shaped member aforesaid to form an enclosure, the second member having a lateral flange substantially parallel to the flange of the first mentioned member, the base of said second member having a passage therethrough for fluid, a valve within said enclosure controlling the flow of fluid through the passage in the base of said second member, means including an abutment member within said enclosure for limiting the opening movement of said valve, said abutment member extending through the base of the first mentioned member and having a passage therethrough for fluid, spring means sleeved on said abutment member and normally holding said valve in closed position, said valve having an orifice for fluid in communication with the passages aforesaid in the abutment member and in the base of the second member, a valve sleeved on said second member between the parallel flanges of both members and controlling the flow of fluid through the passages in the lateral flange of said first member, and spring means sleeved on said second member between the flange thereof and said last mentioned valve and normally holding the latter in closed position.

4. A valve assembly of the class described comprising a substantially cup shaped member having a lateral flange, the base of the cup shaped member and said flange having one or more passages therethrough for fluid, an inverted substantially cup shaped member opening toward and cooperating with the cup shaped member aforesaid to form an enclosure, the second member having a lateral flange substantially parallel to the flange of the first mentioned member, the base of said second member having a passage therethrough for fluid, a valve within said enclosure controlling the flow of fluid through the passage in the base of said second member, means including an abutment member within said enclosure for limiting the opening movement of said valve, said abutment member extending through the base of the first mentioned member and having a passage therethrough for fluid, spring means sleeved on said abutment member and normally holding said valve in closed position, said valve having an orifice for fluid in communication with the passages aforesaid in the abutment member and in the base of the second member, a valve sleeved on said second member between the parallel flanges of both members and controlling the flow of fluid through the passages in the lateral flange of said first member, and spring means sleeved on said second member between the flange thereof and said last mentioned valve and normally holding the latter in closed position, said second member being adjustable relative to said first member to vary the tension of both spring means aforesaid.

5. A valve assembly of the class described comprising a substantially cup shaped member having a lateral flange, the base of the cup shaped member and said flange having one or more passages therethrough for fluid, an inverted substantially cup shaped member opening toward and cooperating with the cup shaped member aforesaid to form an enclosure, the second member having a lateral flange substantially parallel to the flange of the first mentioned member, the base of said second member having a passage therethrough for fluid, a valve within said enclosure controlling the flow of fluid through the passage in the base of said second member, means including an abutment member within said enclosure for limiting the opening mevement of said valve, said abutment member extending through the base of the first mentioned member and having a passage therethrough for fluid, spring means sleeved on said abutment member and normally holding said valve in closed position, a valve sleeved on said second member between the parallel flanges of both members and controlling the flow of fluid through the passages in the lateral flange of said first member, and spring means sleeved on said second member between the flange thereof and said last mentioned valve and normally holding the latter in closed position.

6. A valve assembly of the class described comprising a pair of relatively movable members forming a hollow enclosure, one of said members having a lateral flange provided with one or more passages for hydraulic medium, the other of said members having a passage for supplying hydraulic medium to the interior of said enclosure, said one member having one or more passages for discharging hydraulic medium from said enclosure, a disc valve within said enclosure controlling the flow of hydraulic medium through said supply passage in said other member, means including an abutment member within said enclosure for limiting the opening movement of said valve, said abutment member extending through a wall of said enclosure and having a passage for discharging hydraulic medium from said enclosure, spring means sleeved on said abutment member and normally closing said valve, and a spring pressed valve outside and slidable on a part of said enclosure for controlling the flow of hydraulic medium through the passages in said lateral flange.

7. A valve assembly of the class described comprising a pair of relatively movable members forming a hollow enclosure, one of said members having a passage for supplying hydraulic medium to the interior of said enclosure, the other of said members having one or more passages for discharging hydraulic medium from said enclosure, a disc valve within said enclosure controlling the flow of hydraulic medium through said supply passage, means including an abutment member within said enclosure for limiting the opening movement of said valve, said abutment member extending through a wall of said enclosure and having a passage for discharging hydraulic medium from said enclosure, and spring means sleeved on said abutment member and normally closing said valve.

8. A valve assembly of the class described comprising a pair of relatively movable members forming a hollow enclosure, one of said members having a passage for supplying hydraulic medium to the interior of said enclosure, the other of said members having one or more passages for discharging hydraulic medium from said enclosure, a disc valve within said enclosure controlling the flow of hydraulic medium through said supply passage, means including an abutment member within said enclosure for limiting the opening movement of said valve, said abutment member extending through a wall of said enclosure and having a passage for discharging hydraulic medium from said enclosure, and spring means sleeved on said abutment member and normally closing said valve, said disc valve having an orifice permitting hydraulic medium to flow from the supply passage of said enclosure to the discharge passage in said abutment member.

9. In a valve assembly for hydraulic shock absorbers, a pair of cooperating members forming a hollow enclosure, one of said members having a supply passage for hydraulic medium extending therethrough into said enclosure, the second of said members having one or more discharge passages for hydraulic medium extending therethrough from said enclosure, a valve within said enclosure controlling said supply passage, and means including an abutment member within said enclosure for limiting the opening movement of said valve, said abutment member extending through a wall of said enclosure and having a passage therethrough for conducting hydraulic medium from said enclosure, said valve having an orifice through which hydraulic medium from said supply passage may pass directly to the passage in said abutment member, and spring means encircling said abutment member and normally holding said valve in closed position.

RALPH H. WHISLER, Jr.

REFERENCES CITED

The following references are of record in the file of this patent:

UNITED STATES PATENTS

| Number | Name | Date |
| --- | --- | --- |
| 1,584,787 | Marshall | May 18, 1926 |
| 1,650,494 | Dally | Nov. 22, 1927 |
| 1,800,631 | Hewitt | Apr. 14, 1931 |
| 2,016,390 | Richardson | Oct. 8, 1935 |
| 2,087,451 | Rossman et al. | July 20, 1937 |
| 2,090,621 | Chisholm, Jr. | Aug. 24, 1937 |
| 2,144,583 | Focht | Jan. 17, 1939 |

FOREIGN PATENTS

| Number | Country | Date |
| --- | --- | --- |
| 822,835 | France | Oct. 4, 1937 |